Figure 1:
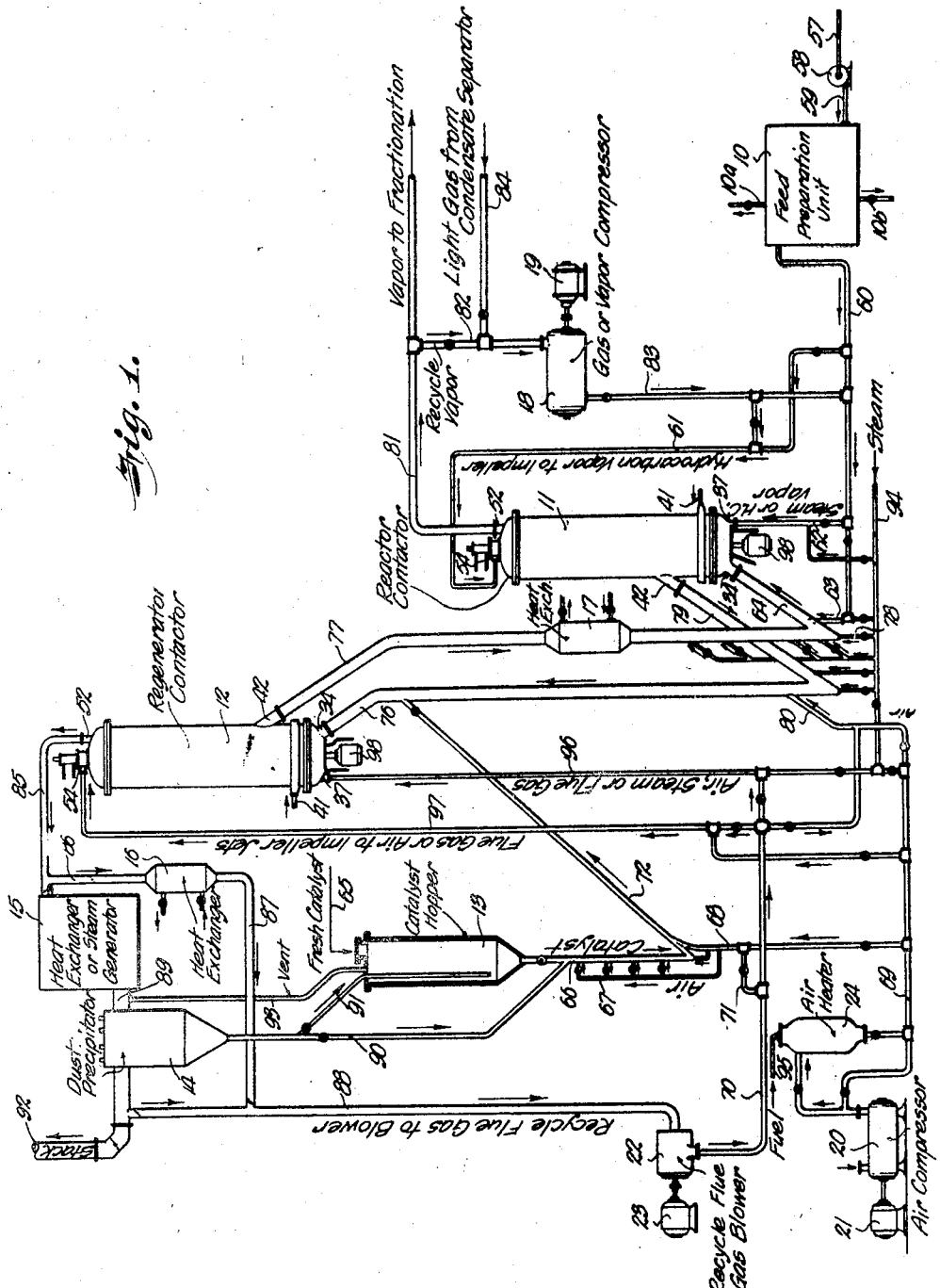

April 15, 1947. C. W. STRATFORD ET AL 2,419,097
PROCESS FOR CATALYTICALLY REACTING GASEOUS MATERIAL
Filed May 22, 1944 3 Sheets-Sheet 2

INVENTORS.
CHARLES W. STRATFORD
DAVID H. PUTNEY
BY Thos. E. Scofield
ATTORNEY.

April 15, 1947.   C. W. STRATFORD ET AL   2,419,097
PROCESS FOR CATALYTICALLY REACTING GASEOUS MATERIAL
Filed May 22, 1944   3 Sheets-Sheet 3

INVENTORS.
CHARLES W. STRATFORD
DAVID H. PUTNEY.
BY Thos. C. Acefield.
ATTORNEY.

Patented Apr. 15, 1947

2,419,097

UNITED STATES PATENT OFFICE 2,419,097

PROCESS FOR CATALYTICALLY REACTING GASEOUS MATERIAL

Charles W. Stratford and David H. Putney, Kansas City, Mo., assignors to Stratford Development Corporation, Kansas City, Mo., a corporation of Delaware Application May 22, 1944, Serial No. 536,702

6 Claims. (Cl. 196—52)

Our invention relates to improvements in a process for catalytically reacting gaseous material in the presence of a solid catalyst and reactivating the catalyst and refers more particularly to a process for the production of high octane motor fuel from petroleum hydrocarbons.

The essence of the invention resides in contacting the reactant gaseous materials with the solid catalyst in a uniform and intimate manner so that a greater surface of the catalyst is exposed to the reactants, a more uniform temperature is maintained throughout the reaction mass, and controlling the catalyst reactant ratio independently and throughout a wide range, thereby providing a flexible control and regulation upon the character of the product.

More specifically, there are established separate rings or cycles of moving catalyst in both the reacting and regenerating stages including an upflowing catalyst column and a downflowing catalyst column. Movement of the catalyst within the cycles is produced by reducing the density or specific weight of the upflowing columns by introduction of gaseous materials thereto and accelerating the movement of the catalyst in the upflowing columns by the use of rotating impellers. In the downflowing catalyst columns of the reacting and regenerating stages which are of greater specific weight gravitational movement is relied upon. The positive mechanical circulation of the catalyst in the reactor increases the catalyst reactant ratio at the point of initial contact and prevents channeling of the vapors owing to the stirring and turbulence of the catalyst caused by the impellers. Thus, the circulation rate and the catalyst reactant ratios in the reaction cycle may be accurately controlled by the degree of aeration, speed of the impellers and the amount of vapor recycled to the upflowing catalyst column in the reaction stage.

Furthermore, the degree of mixing as well as the catalyst reaction ratios in the reacting stage may be controlled entirely independently of the throughput of fresh reactants charged. The process also affords a regulation of the catalyst reactant ratio in the reacting stage entirely independently of the catalyst cycle to the regenerator. The introduction of the reactant feed through ports in the under side of the impeller blades into both the reacting and regenerating steps provides a uniform distribution and dispersion of the gaseous materials throughout the moving catalyst masses.

An extremely wide range of aeration control is provided by recirculation of either total effluent vapors or residual light gases removed from the vapors after condensation, or air or steam.

The catalyst introduced to both the reacting and regenerating cycles is intimately contacted with the gaseous materials for at least one cycle through the respective stages.

Finally, the catalyst passing through the downflowing columns may be stripped of entrained reaction materials by the introduction of gas or vapor to the respective columns and these stripped materials are combined with the gaseous materials separated from the catalyst after passage through the upflowing columns. The total gases or vapors leaving the reaction zone mixture together with entrained catalyst fines are passed to cyclone separating equipment which may be made a part of the reacting or regenerating equipment or installed separately. In the latter case the catalyst fines are returned to the respective stages.

Figure 2:
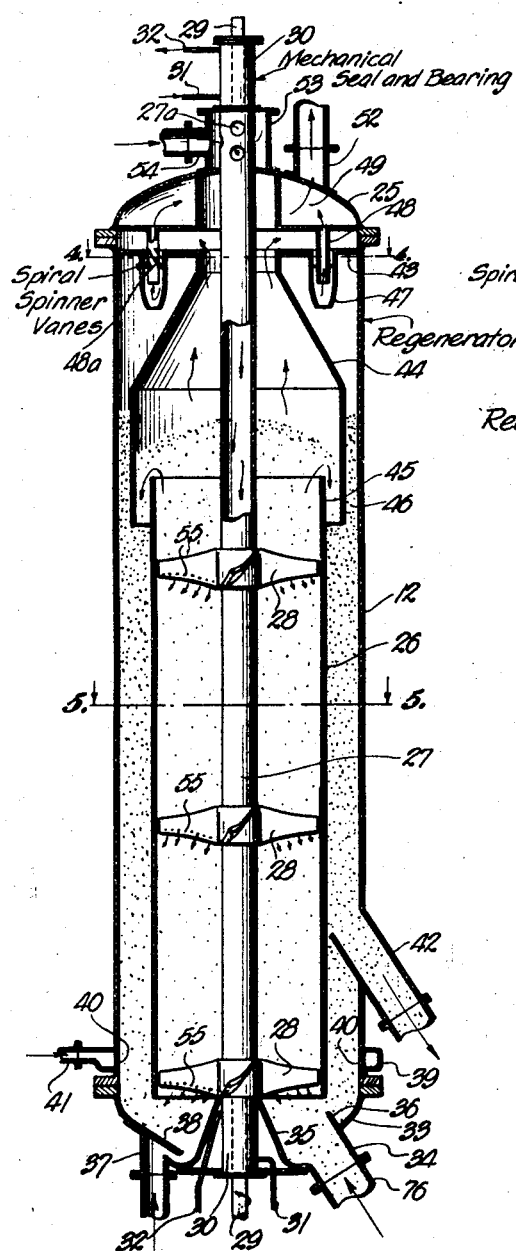
Figure 3:
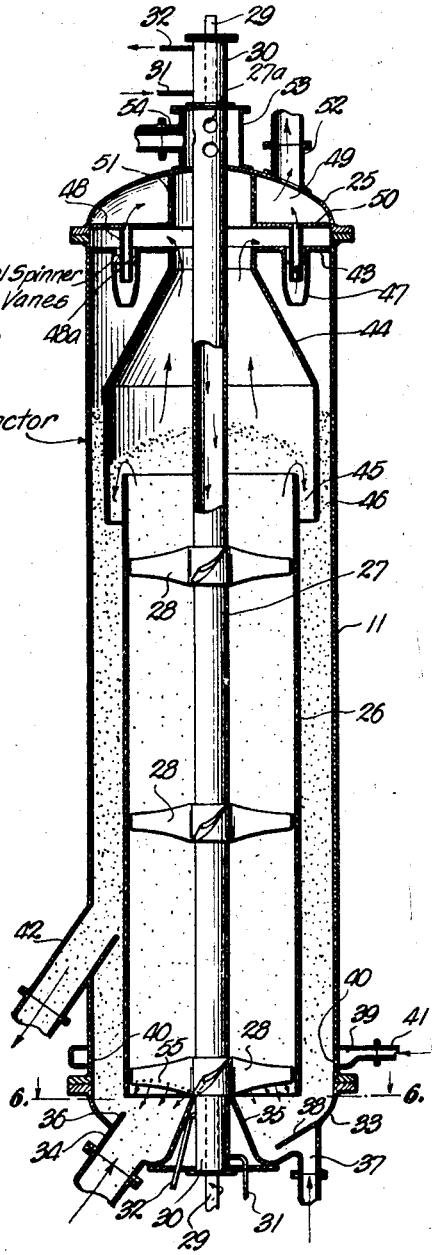
Figure 4:
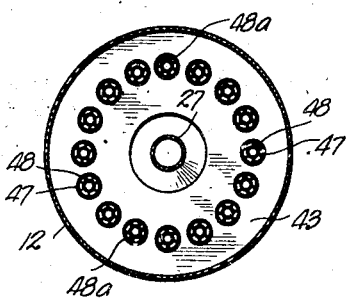
Figure 7:
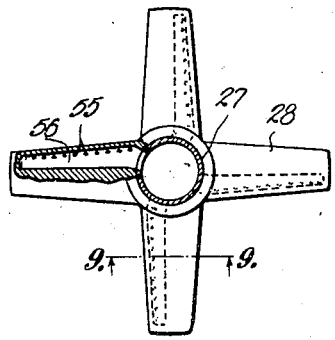
Figure 5:
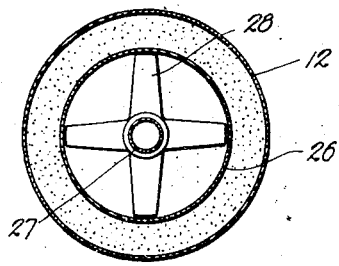
Figure 8:
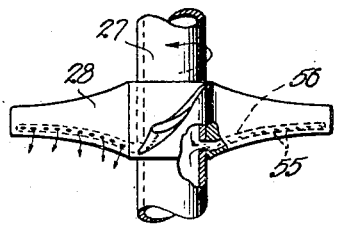
Figure 6:
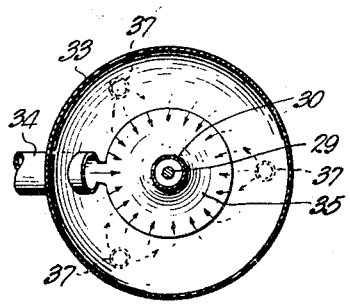
Figure 9:

In the accompanying drawings which form a part of the instant specification and are to be read in conjunction therewith and in which like reference numerals are used to indicate like parts in the various views, Fig. 1 is a flow diagram of an apparatus in which the process may be practiced, Fig. 2 is an enlarged vertical section of the regenerator, Fig. 3 is an enlarged vertical section of the reactor, Fig. 4 is a view taken on the lines 4—4 in Fig. 2 in the direction of the arrows, Fig. 5 is a view taken on the line 5—5 in Fig. 2 in the direction of the arrows, Fig. 6 is a view taken on the line 6—6 in Fig. 3 in the direction of the arrows, Fig. 7 is an enlarged face view of an impeller with parts broken away to show orifices along its blades for the discharge of gaseous material, Fig. 8 is an edge view of the impeller shown in Fig. 7 with parts broken away to show the interior ducts, Fig. 9 is a sectional view taken through one of the impeller blades on the line 9—9 in Fig. 7 in the direction of the arrows.

Referring to the drawings and particularly to Fig. 1, at 10 is shown what is designated as a feed preparation unit. This includes such equipment necessary to proper pretreatment of the feed to put it in condition for passage through the catalytic cycles. In the production of motor fuel or fractions thereof this unit will normally include a heater and fractionator to convert liquid hydrocarbons to vapors or gaseous material and such separators or heat exchangers as are necessary to convert the vapors into a preferred feed adaptable for charging to the reaction stage. The character of the equipment included in the said preparation unit will depend entirely upon the character of the charging stock used, and the type of product to be recovered. In the event a selected gas oil feed is to be used the equipment will be relatively simple; where a reduced crude or heavier stock is charged more elaborate provision may be made for converting the charge to an appropriate stock for introduction to the reactor. At 11 is diagrammatically shown the reactor contactor and at 12 a regenerator contactor. These will be hereinafter referred to as the reactor and regenerator or in the process as the reacting step and the regenerating or reactivating step. A catalyst hopper is shown at 13 and a dust precipitator at 14. A heat exchanger or steam generator is diagrammatically indicated by the block or square 15; 16 and 17 are heat exchangers; 18 is a gas or vapor compressor driven by a motor 19; 20 is an air compressor driven by motor 21 and 22 is a recycle flue gas blower driven by motor 23. At 24 is shown an air heater for supplying heated air to the reactor and regenerator as hereinafter explained.

A preliminary explanation of the structural features and operation of the reactor and regenerator will facilitate an understanding of the description of the process to follow. Cross sections of this equipment are shown in Figs. 2 and 3, and since their construction is substantially identical, a description of one will suffice. The contactors shown in Figs. 2 and 3 consist of external cylindrical shells which are designated as a whole in Fig. 1 by the numerals 11 and 12. These shells are closed at the top by heads 25 and attached to the shells by bolted flanges. Concentrically within the shells 11 and 12 are supported open-ended cylindrical tubes 26 and within the tubes are hollow shafts 27. Upon the hollow shafts 27 are mounted impellers 28. At the top and bottom the hollow shafts 27 are connected with solid shaft extensions 29 which rotate within bearings equipped with mechanical seals designated as a whole by the numerals 30. Cooling fluid is circulated through the casings 30 surrounding the bearings and seals being introduced thereto through pipes 31 and discharged through pipes 32. Removably attached to the lower ends of the shells 11 and 12 by bolted flanges are bottoms 33. Connected into the bottoms are catalyst inlet ports 34. Cone-shaped supports 35 surrounding the lower seals 30 and baffle members 36 serve to direct the catalyst into the open-ended tubes 26. Gas inlet pipes 37 entering bottoms 33 have baffles 38 across the mouths of the inlets to divert the entering gases into tubes 26 with the upflowing catalyst. Surrounding the outer shells 11 and 12 near their lower extremities are manifolds 39 which have a plurality of ports 40 through the shells around their circumferences so gas introduced through pipes 41 will pass into the downflowing columns of catalyst passing through the annular spaces between the shells and open-ended tubes 26. Also connected into the outer shells of the reactor and regenerator are catalyst discharge pipes 42. Within the upper end of the shells are horizontal annular partitions 43 which support hoods 44 at their upper narrow necks. These hoods have the shape of inverted funnels and their enlarged depending ends or skirts extend beyond and surround the upper ends of tubes 26. The positioning of the lower skirts of the hoods between the upper ends of tubes 26 and the shells form annular passageways 45 and 46. Depending from the horizontal partitions 43 are a plurality of open-ended pipes 47 and into these pipes from above extend tubes 48 of a smaller diameter producing annular passageways therebetween. The smaller open-ended tubes 48 are connected from above into compartments 49 formed in the heads by horizontal partitions 50 and vertical tubular partitions 51. Discharge from compartments 49 is through pipes 52.

Centrally of the removable covers 25 are cylindrical compartments 53 which surround the upper ends of hollow shafts 27. Connected into compartments 53 are gas inlet ports 54 and in the periphery of the hollow shafts within the compartments 53 are a plurality of orifices 27a which permit the entrance of gaseous material introduced through pipes 54 into the hollow shafts.

In the lower edges of the impeller blades of the regenerator and the lower impeller of the reactor are small orifices or holes 55 communicating with radial ducts 56 extending longitudinally of the blades and furnishing passageways for the gases introduced into the top of the hollow shafts 27 through pipes 54. The construction of the impellers which have the ducts and orifices along their lower edges is detailed in Figs. 7, 8 and 9.

In order to distribute more uniformly the gaseous materials to both the reactor and regenerator, instead of by a single inlet pipe as shown in Fig. 1, separate inlets evenly distributed as shown in Fig. 6 may be used and supplied by manifolding not shown. By locating the inlet feed of gaseous material to the reactor and regenerator at a plurality of points in the bottom of the shells, more uniform distribution of the gases throughout the open-ended tubes and the upflowing column of catalyst is obtained.

In operation the process will be described in the production of motor fuel or its constituents from petroleum hydrocarbons but by doing so it is is not intended that it shall be limited to this purpose. In other words, the method is adaptable to any type of operation in which gaseous materials are catalytically reacted and the catalyst regenerated for reuse.

The feed material is supplied through charging pipe 57 and is forced by pump 58 through pipe 59 and then through the feed preparation unit 10 previously mentioned. Any light or heavy fractions not desired as feed stock to the reactor are withdrawn through lines 10a and 10b. The selected hydrocarbon material in condition for catalytic treatment passes thence through pipe 60 and line 61 which connects to the inlet nozzle 54 at the top of the reactor. Simultaneously, the feed supplied through pipe 60 may be passed through branch line 62 which is connected to nozzle 37 in the bottom of the reactor or if a plurality of inlet pipes are used the feed is introduced to the reactor at separate points, being diverted by baffles 38 to flow into the open-ended circulation tube 26. A portion or all of the feed may also be charged through pipe 63 and injected thereby into recycled and fresh catalyst supplied to the reactor through conveyor tube 64 connected to nozzle 34. By controlling the valves in lines 61, 62 and 63, the flow of feed may be supplied through any one or any combination of the supply lines in regulated quantities by means of metering devices not shown. In any event, whether introduced through inlet nozzle 37 or with the catalyst through nozzle 34, the reactants are supplied into the bottom of the circulating tube 26. Likewise, if charged into the nozzle 54 at the top of the reactor the reactants enter holes 27a in the hollow shaft and are discharged from the orifices in the lower impeller at the bottom of the circulating tube.

Fresh catalyst is admitted to the system at 65 into the top of the catalyst hopper 13. It flows by gravity through discharge pipe 66 and is picked up either by air supplied through pipe 68, flue gas supplied through pipe 68 or mixtures of the two. The source of the compressed air in either heated or unheated form is compressor 20 and heater 24 thence through pipe 69 into pipe 68. Through manifold pipe 67 is supplied air or flue gas as required to aerate the downflowing catalyst column to a free flowing condition. The source of the flue gas is the recycled flue gas blower 22 which discharges into pipe 70 thence through crossover 71 into pipe 68. The suspension of catalyst and air or catalyst and flue gas or controlled mixtures of the gaseous medium and catalyst pass up through duct 72 into tube 76 connected into the bottom of the regenerator at nozzle 34. The passage of the catalyst through the regenerator will be described later in connection with the regeneration operation. For the present it suffices to say that after passing through regenerator 12 it is discharged hot and in activated form through pipe 77 and may have its heat tempered in heat exchanger 17. With the aid of a gas carrier medium supplied through pipes 63 the catalyst is introduced through pipe 64 into the bottom of the reactor. At the bottom end of the circulating tube 26 the catalyst is mixed or contacted with the reactants supplied either through inlet pipes 37 or through the orifices in the bottom edges of the impeller blades or both. Simultaneously, recirculated catalyst gravitating in a downflowing column in the annular space between the circulating tube 26 and shell 11 is combined with the incoming catalyst and the reactants at the lower mouth of the circulating tube. This mixture of catalyst and reactant gases being of less density than the column of catalyst in the annular space surrounding the circulating tube tends to move upwardly. This movement is accelerated by the pumping action of the rotating impellers. The agitation, turbulence and rotative movement given the catalyst reactant mixture within the circulating tube prevents channeling of the reactants through the catalyst bed and assures a uniform dispersion and distribution of the catalyst and reactants resulting in a uniform temperature of the mass as it progresses through the reaction zone. On arrival at the top of the open circulating tube the gases and vapors continue upward into the hood 44. Because of the great difference in density between the solid catalyst and the gases or vapors only a very small percentage of the catalyst will be entrained with the gases and vapors and this entrained catalyst will be the smaller catalyst particles or fines. All of the catalyst with the exception of the entrained portion flows over the edge of the circulation tube to form the downflowing column in the annular space surrounding the tube. After the separation of most of the reaction gases from the catalyst at the top of the circulation tube the catalyst vapor mixture entering the downflowing column is of much greater density than it was in the upflowing column. The voids of this downflowing catalyst column represent much less volume than the voids of the upflowing column. Nevertheless they are still filled with reactant vapors as the mixture enters the downflowing column. As the catalyst flows downward the volume of these voids between the catalyst particles becomes smaller because of the increased pressure occasioned by the weight of the catalyst column. This action causes the release of some of the entrained gases so that the downflowing column is to a limited extent self-aerating. Under some operating conditions this self-aeration is sufficient to keep the catalyst in flowing condition. If, however, additional aeration is required to maintain the catalyst in flowing condition or if it is desired to strip the reaction gases from the catalyst voids in the downflowing column then such aerating gases or stripping steam may be introduced through line 41 and manifold 39. A large proportion of the catalyst in the downflowing column is recycled to rejoin the reactants at the bottom of the circulating tube. A portion of the catalyst in the downflowing column is withdrawn through nozzle 42. This nozzle diverts the catalyst through tube 79 and tube 76 for introduction to the regenerator with the aid of air and flue gas supplied through pipe 80. The reacted material separated at the top of the upflowing catalyst column passes upwardly through hood 44 into horizontal ducts which direct the reacted material to cyclone separators built into the top of the reactor in the form of the concentric depending tubes 47 and 48. The gases pass downwardly through annular spaces between the tubes in which are located spiral vanes 48a shown in cross section in Fig. 4. These spiral spinner vanes give the gases a whirling movement and owing to centrifugal force separate entrained catalyst. The separated catalyst is discharged through the lower ends of tubes 47 and join the downflowing catalyst column. The flow of the gases is reversed and they rise through tubes 48 into compartment 49 within the head. From this compartment they are discharged through nozzle 52 which is connected to vapor line 81. A valve controlled recycle pipe 82 furnishes a means for returning controlled portions of the reacted vapors through compressor 18 and pipe 83 to feed line 60 and 61. As an alternative operation lighter gas separated from the condensate separator may be introduced through pipe 84 and combined in controlled quantities with the recycled vapor or introduced without the vapor to the feed by closing the valve in line 82.

To relieve the catalyst in the annular column between the circulating tube and shell of entrained reaction products a stripping gas or vapor may be introduced to the lower part of the column through pipe 41. This gaseous material may be a heated non-condensable gas, steam or a mixture of the two. Percolating upward through the downflowing column entrained volatiles are removed and rise to join the reacted constituents separated from the upflowing column, either inside or outside of the hood 44. These stripped constituents pass out with the reacted material through built-in cyclone separators and are discharged from the top of the reactor through vapor line 81.

Having described the manner of introducing the catalyst to the system and its travel through the reactor, the travel of used catalyst upon discharge from the reactor and through the regenerator will now be explained. Catalyst which requires removal of contaminating carbon deposit is withdrawn from the downflowing annular column of the reactor through nozzle 42, line 79, and is picked up by the gaseous conveying medium introduced through pipe 80 and is passed through duct 76 to the inlet nozzle 34 of the regenerator. Catalyst travel through the regenerator is identical to its travel through the reactor, flowing upwardly through the circulation tube 26 to the top where it overflows and gravitates downwardly through the annular space between the circulation tube and shell to be recirculated. With the aid of the rotating impellers 28 and the introduction of air through inlets 37 and through the orifices in the lower edges of the impeller blades the catalyst within the circulation tube is thoroughly mixed and agitated and the air uniformly distributed and dispersed therethrough. Air may also be introduced into the downflowing catalyst column through manifold 39 to aid in burning carbon from the catalyst. Combustion products separated from the catalyst by the regenerating gases pass off from the upflowing and downflowing columns of catalyst, through the built-in cyclone separators in the head of the regenerator thence into compartment 49 and out through nozzle 52. The catalyst removed by centrifugal force created in the built-in separators drops back into the outer downflowing catalyst column and is recirculated through the regenerator.

It is contemplated that the separators shown as built into the tops of the reactor and regenerator may exist as separate equipment of conventional cyclone or other suitable type, in which case they would be interposed in the pipes which are connected to the discharge nozzles 52 with provision for returning the separated catalyst fines back into the respective stages.

The combustion gases containing contaminants removed from the catalyst in the regenerator pass out through discharge nozzle 52 through pipe 85 and are directed through equipment diagrammatically shown at 15 and designated as heat exchanger or steam generator, or portions of the gases may be diverted through line 86 to heat exchanger 16 thence through line 87 to recirculating pipe 88 through which they pass to the suction of flue gas blower 22. After passage through unit 15 the gases exhausted of a substantial part of their heat pass through duct 89 into the dust precipitator 14 where remaining particles of catalyst fines are removed. The solids separated in the dust precipitator are discharged through pipes 90 or 91 into the fresh catalyst supply or returned directly to the regenerator. The gases from the precipitator may be either recycled through line 88 to the flue gas blower 22 or exhausted through the stack 92. The fresh catalyst hopper 13 is supplied with a vent line 93 which is connected into duct 89. Steam is introduced to the system through pipe 94 and may be distributed to the reactor, regenerator or into the catalyst conveyor lines or combined with the flue gas through the piping shown. Fuel for use in the air heater 24 is introduced through pipe 95. Cooled recycle combustion gases may be supplied through line 80 for conveying the used catalyst into the regenerator through line 76 and they may also be introduced into the regenerator through lines 96, 97 and 41 for controlling the temperature of the regeneration process. Air used as a regenerating medium is supplied to the bottom of the regenerator through pipe 96 and to the top of the regenerator for circulation through the hollow shaft and impellers through pipe 97. It will be noted that all of the impellers in the regenerator are equipped with ducts and orifices for intimately and uniformly distributing the combustible gas throughout the upflowing catalyst column. Introduction of the feed to the reactor, however, through the hollow shaft is effected solely through orifices in the lower impeller in order that the reactants be required to pass the entire length of the upflowing column.

Motive means for rotating the hollow shafts 27 within both the reactor and regenerator upon which impellers 28 are mounted are diagrammatically shown at 98.

Heat exchangers 16 and 17 may be utilized as a source of heat as required in the preparation of the feed in unit 10.

In a copending application, Serial No. 509,702, filed November 10, 1943, there was disclosed a method of contacting reactants and catalyst by circulating a mixture of vapor and pulverized solids at velocities sufficiently high to maintain the solid particles in suspension in the vapor in both the reacting and regenerating steps. There is a limit, however, to the amount of solid material which can be carried in a gas or vapor stream at any given velocity. This amount varies somewhat with the specific weight of the solid and the size of the solid particles. For certain reactions high concentration of solid catalyst per unit of vapor volume is not required and for such reactions the method described in the copending case affords satisfactory conditions.

Certain reactions, however, require very high concentration of catalyst per unit of reactant volume. It is known, for example, that in the cracking of hydrocarbons using conventional catalysts such as aluminum silicates or hydrosilicates, the reaction tends to produce iso-paraffinic and saturated branched chain hydrocarbons when the amount of catalyst per unit volume of reactant is increased and the product correspondingly increases in anti-knock properties making it more desirable for use in motor fuel.

The present invention makes possible the maintenance of a vapor catalyst mixture having a density of ten (10) pounds per cubic foot or less and as high as forty (40) pounds per cubic foot or higher while introducing to the reaction zone fresh or regenerated catalyst in an amount of between five (5) and twenty (20) pounds per pound of fresh reactant vapors and at the same time circulating as high as five hundred (500) pounds or more of stripped catalyst per pound of fresh reactant vapors. The catalyst reactant ratio at any point in the reactor may be defined as the pounds of catalyst divided by the pounds of reactant vapor passing that point in any unit of time.

An additional advantageous feature of the instant process is the provision for circulating the catalyst in a cyclic travel within the reactor while the reactant vapors are not so circulated. This feature provides for a wide range of catalyst reactant ratios without appreciably changing the residence time of the vapors within the reaction zone. The density of the reactant-catalyst mixture is independently controlled by the rate of catalyst circulation within the reactor and the introduction of recycled reactant vapors thereto. The quantity of recycled vapors may thus be controlled separately and independently of the circulation taking place within the reactor.

A further advantage obtained by the mechanical pumping effect of the impellers is to avoid or limit classification or segregation of the finer from the coarser portions of the catalyst which usually occurs when mixing of the catalyst and reactants is effected by vapors or gases only.

An operation of the reactor for cracking gas oil may, for example, be conducted under the following conditions:

Fresh gas oil vapors are introduced through the bottom inlet pipes or through the hollow shaft and blades of the lower impeller to the bottom of the upflowing catalyst column in the circulating tube. For each pound of gas oil vapors so fed fresh or regenerated catalyst is introduced into the bottom of the reactor in an amount of approximately ten (10) pounds. For each pound of fresh or regenerated catalyst so introduced five hundred (500) pounds of catalyst will be circulated through the downflowing catalyst column between the circulating tube and shell where it may be stripped of hydrocarbon vapors. This five hundred (500) pounds of circulated catalyst will join the incoming fresh catalyst to provide five hundred ten (510) pounds of catalyst entering the reaction zone for each pound of fresh gas oil feed, thus, providing a catalyst-reactant ratio of five hundred ten (510) to one (1).

Aeration of the mixture in the reaction zone can be established to maintain the density of the mixture at approximately twenty-five (25) pounds per cubic foot by supplementing the fresh gas oil vapor feed with steam and with recycled vapors consisting of effluent vapors from the reactor or a portion fractionated or separated therefrom. The downflowing catalyst column in the reactor will be aerated with steam or vapor to a density of approximately thirty-five (35) pounds per cubic foot. The differential weights of the two columns tend to produce circulation upwardly within the circulation tube and downwardly outside the circulation tube. This unbalanced condition in the two columns would cause an upward flow in the central tube at a velocity of less than one (1) foot per second. The pumping action of the impellers, however, accelerates the velocity in the upflowing column to three (3) feet per second or higher. Obviously, different feed stocks and different reactions will require different conditions within the reactor and it is not the intention by this example to limit the operating conditions to any specific range of catalyst reactant ratios, density of mixtures or speed of circulation.

Furthermore, it is contemplated as well to accurately control the temperatures of reactivation of catalyst in the regenerator by the use of a supplementary heat exchanger. This exchanger is applied to the regenerator in such a manner that heat may be removed from the circulatory mass of catalyst.

From the foregoing it will be seen that the invention is well adapted to attain the ends and objects hereinbefore set forth together with other advantages which are obvious and which are inherent to the process and apparatus disclosed.

As many possible embodiments may be made of the invention without departing from the scope thereof, it is understood that all matter herein set forth or shown in the drawings is to be interpreted as illustrative and not in a limiting sense.

Having thus described our invention, we claim:

1. In a process of reacting gaseous hydrocarbons in the presence of a solid catalyst in a reaction zone, the improvement which resides in establishing a cyclic ring of moving catalyst within said reaction zone including separated upflowing and downflowing catalyst columns, passing the gaseous material in contact and concurrently with the moving catalyst principally in the upflowing column subjecting the upflowing column to rotative energy applied at spaced intervals to accelerate the lineal flow of catalyst in the ring and turbulence in the upflowing column, and separating the catalyst and reacted materials after contacting in the upflowing column.

2. In a process of reacting gaseous hydrocarbons in the presence of a solid catalyst in a reaction zone, the improvement which resides in establishing a cyclic ring of moving catalyst within said reaction zone including separated upflowing and downflowing catalyst columns, said upflowing column being of a less density than the downflowing column, passing the gaseous reactants in contact and concurrently with the catalyst in the upflowing column subjecting the upflowing column to rotative energy applied at spaced intervals to accelerate the lineal flow of catalyst in the ring and turbulence in the upflowing column, and separating the reacted materials from the catalyst after contact in the upflowing column.

3. In a process of reacting gaseous hydrocarbons in the presence of a solid catalyst in a reaction zone, the improvement which resides in establishing a cyclic ring of moving catalyst within said reaction zone including separated upflowing and downflowing catalyst columns, passing the gaseous reactants in contact and concurrently with the upflowing column and thereby lessening the density of said column, subjecting the catalyst and reactants in the upflowing column to rotative energy applied at spaced intervals to accelerate the lineal flow of catalyst in the ring and turbulence in the upflowing column while permitting gravitational flow of the catalyst in the downflowing column, separating the catalyst from reacted materials after contact in the upflowing column and introducing a heated gaseous material to the downflowing column to strip the catalyst of entrained gaseous reactants, and combining the reacted materials separated from the upflowing column with the gaseous reactants stripped from the downflowing column.

4. In a process of reacting gaseous hydrocarbons in the presence of a solid catalyst in a reaction zone, the improvement which resides in establishing a cyclic ring of moving catalyst within said reaction zone including separated upflowing and downflowing catalyst columns, subjecting the upflowing column to rotative energy applied at spaced intervals to accelerate the lineal flow of catalyst in the ring and turbulence in the upflowing column, passing the reactants in contact and concurrently with the upflowing column thereby lessening the density of said column, separating the reactants from the catalyst after passage therethrough, introducing heated gaseous material to the downflowing column to strip the catalyst in said column of entrained reactants and combining the reacted materials separated after passage through the upflowing column with the reactants stripped from the catalyst of the downflowing column.

5. A process of catalytically reacting gaseous hydrocarbons and catalyst regeneration wherein a finely divided solid catalyst after passing in contact with the gaseous reactants in a reaction zone is reactivated in a regenerating zone and returned to the reaction zone for reuse, the improvement which resides in establishing separate cyclic rings of moving solid pulverized catalyst within the reacting and regenerating zones, said rings including upflowing and downflowing catalyst columns, subjecting the upflowing columns to rotative energy applied as spaced intervals to accelerate the lineal flow of catalyst in the rings and turbulence in their upflowing columns passing the reactant gaseous material in contact and concurrently with the upflowing column in the reaction zone and regenerating gases in contact and concurrently with the upflowing column in the regenerating zone, adding contaminated catalyst withdrawn from the reaction zone ring to the regenerating zone ring and maintaining a predetermined catalyst reactant ratio in the feed to the reaction zone by proportioning recycled catalyst within the ring with catalyst charged from the regenerating zone and gaseous reactants supplied to the ring.

6. A process as in claim 5 wherein the density of the upflowing columns in both the reaction zone and regenerating zone rings are less than the densities in the downflowing columns in the respective rings.

CHARLES W. STRATFORD.
DAVID H. PUTNEY.

REFERENCES CITED

The following references are of record in the file of this patent:

UNITED STATES PATENTS

| Number | Name | Date |
| --- | --- | --- |
| 2,334,553 | Harding | Nov. 16, 1943 |
| 2,337,684 | Scheineman | Dec. 28, 1943 |
| 2,347,747 | Melaven | May 2, 1944 |
| 2,347,682 | Gunness | May 2, 1944 |
| 1,577,871 | Prichard et al. | Mar. 23, 1926 |
| 2,292,897 | Nielsen | Aug. 11, 1942 |
| 2,367,351 | Hemminger | Jan. 16, 1945 |
| 2,378,342 | Voorhees et al. | June 12, 1945 |

FOREIGN PATENTS

| Number | Country | Date |
| --- | --- | --- |
| 533,037 | German | Sept. 8, 1931 |